(12) United States Patent
Matsumura et al.

(10) Patent No.: US 6,456,664 B1
(45) Date of Patent: *Sep. 24, 2002

(54) MOTION IMAGE ENCODER

(75) Inventors: Yasuko Matsumura; Shigeru Fukunaga; Toshihisa Nakai, all of Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,209

(22) Filed: Mar. 19, 1999

(30) Foreign Application Priority Data

Aug. 26, 1998 (JP) .......................................... 10-239937

(51) Int. Cl.[7] ................................................. H04N 7/12
(52) U.S. Cl. ............................... 375/240.27; 375/240.27
(58) Field of Search ........................ 375/240.13, 240.12, 375/240.24, 240.16, 240.26, 240.27; 348/394.1, 420.1, 699, 700; H04N 7/12

(56) References Cited

U.S. PATENT DOCUMENTS

| | | | | |
|---|---|---|---|---|
| 5,561,529 A | * | 10/1996 | Tanaka et al. ................. | 386/77 |
| 5,737,537 A | * | 4/1998 | Gardos et al. ............... | 709/247 |
| 6,125,144 A | * | 9/2000 | Matsumura et al. ... | 375/240.12 |
| RE36,999 E | * | 12/2000 | Yonemitsu et al. .... | 375/240.16 |
| 6,163,574 A | * | 12/2000 | Yagasaki ............... | 375/240.13 |
| 6,188,792 B1 | * | 2/2001 | Chujoh et al. .............. | 382/236 |

OTHER PUBLICATIONS

Machida et al.: Video Coding Method With Cell Loss Resilience on ATM Networks, The Institutute of Electronics information and Communication Engineers of Japan (PCSJ), pp. 205–208, Oct. 1992.

* cited by examiner

*Primary Examiner*—Nhon Diep
(74) *Attorney, Agent, or Firm*—Wenderoth, Lind, & Ponack, L.L.P.

(57) ABSTRACT

Each of consecutively transmitted frames representing motion images is composed of a given number of blocks. A SAD cumulative value representing an image variation history is derived per block. Blocks to be refreshed, i.e. to be intraframe-coded, are selected based on the SAD cumulative values. Specifically, a given number of the blocks whose corresponding SAD cumulative values are larger among all the SAD cumulative values are selected, or those blocks whose corresponding SAD cumulative values are greater than a threshold value are selected. Thus, the blocks which actually require "refresh" can be preferentially refreshed.

8 Claims, 6 Drawing Sheets

| BLOCK NO. | SAD CUMULATIVE VALUE (SADSUM) |
|---|---|
| B1 | 72 |
| B2 | 189 |
| B3 | 228 |
| B4 | 61 |
| B5 | 58 |
| B6 | 125 |
| B97 | 227 |
| B98 | 231 |
| B99 | 192 |

MOTION IMAGE ENCODER

BACKGROUND OF THE INVENTION

1. Field of the Invention

The present invention relates to a motion image encoder which selectively performs intraframe coding and interframe coding of blocks forming each of consecutively transmitted frames representing motion images and, in particular, to a motion image encoder which performs intraframe coding of particular blocks of each frame as "refresh" for reducing failure of image decoding.

2. Description of the Related Art

Since motion images include a large amount of data, it is effective to reduce redundancy of data for efficient transmission and reception of the motion images. In view of this, the intraframe coding and the interframe coding have been carried out.

In the intraframe coding, the redundancy of data is lessened within each of the frames, while, in the interframe coding, the redundancy of data is lessened between two consecutive frames. According to the intraframe coding, a decoder decodes one frame independently of results of decoding of any preceding frames. In contrast, according to the interframe coding, a decoder decodes one frame relying on results of decoding of all preceding frames. For example, if decoding of one interframe-coded frame fails, all frames subsequent to that frame are subjected to an influence of that failure. Accordingly, the decoder can not reproduce images as expected by an encoder.

Accordingly, for preventing the failure of one frame from continuously affecting decoding of the subsequent frames, the intraframe coding is cyclically executed. The intraframe coding executed for this purpose is called "refresh". The refresh is described in, for example, U.S. patent application Ser. No. 08/924,262 entitled "PICTURE CODING METHOD AND PICTURE CODER" filed on Sep. 5, 1997 by Yasuko MATSUMURA et al (Oki Electric Industry Co., Ltd.), and "Video Coding Method with Cell Loss Resilience on ATM Networks" by MACHIDA et al., The Institute of Electronics Information and Communication Engineers of Japan(PSCJ), pp. 205–208, October 1992.

There is Recommendation ITU-T/H. 261 for the motion image coding. The Recommendation proposes to divide a frame into a plurality of blocks each including a given number of pixels and perform the intraframe coding or the interframe coding per block. This means that the refresh is carried out on a block basis.

In general, the interframe coding can reduce the redundancy of data more effectively than the intraframe coding. Specifically, a data amount of an interframe-coded block is smaller than that of an intraframe-coded block. Therefore, it is desirable that the frequency of the refresh, i.e. the intraframe coding, be smaller.

Heretofore, however, the refresh has been cyclically performed according to a rule regulating order of blocks to be refreshed. Therefore, even though a magnitude of image variation between corresponding blocks of consecutive frames is small so that a possibility of failure in block decoding is also small, the refresh has been carried out, or even though a magnitude of image variation therebetween is large so that a failure possibility is also large, the refresh has not been carried out. In other words, the refresh has been executed more than necessity, or the refresh has not been executed sufficiently. This deteriorates the efficiency of the block coding and decoding.

SUMMARY OF THE INVENTION

Therefore, it is an object of the present invention to provide an improved motion image encoder which can overcome the foregoing problem.

According to one aspect of the present invention, there is provided a motion image encoder which selectively performs intraframe coding and interframe coding of blocks forming each of consecutively transmitted frames representing motion images, the motion image encoder comprising a deriving section which sequentially derives image variation magnitudes per block, each of the image variation magnitudes derived between corresponding blocks of two consecutive frames; an accumulating section which accumulates the image variation magnitudes to derive an image variation cumulative value per block; a selecting section which, based on the image variation cumulative values for the respective blocks, selects at least one of the blocks to be applied with the intraframe coding; and a coding section which applies the intraframe coding to the at least one of the blocks.

It may be arranged that the selecting section selects the at least one of the blocks whose corresponding image variation cumulative value is the greatest among the image variation cumulative values.

It may be arranged that the selecting section selects those blocks whose corresponding image variation cumulative values are larger among the image variation cumulative values.

It may be arranged that the selecting section selects the at least one of the blocks whose corresponding image variation cumulative value is greater than a threshold value.

It may be arranged that the selecting section selects those blocks whose corresponding image variation cumulative values are greater than a threshold value.

It may be arranged that the motion image encoder further comprises a sorting section which sorts the image variation cumulative values in given order, wherein the selecting section selects the at least one of the blocks based on the image variation cumulative values sorted by the sorting section.

It may be arranged that the selecting section stores a rule regulating order of the blocks to be applied with the intraframe coding, and selects the at least one of the blocks based on the image variation cumulative values and the rule.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a motion image encoder according to a preferred embodiment of the present invention will be described with reference to the accompanying drawings.

Figure 1:
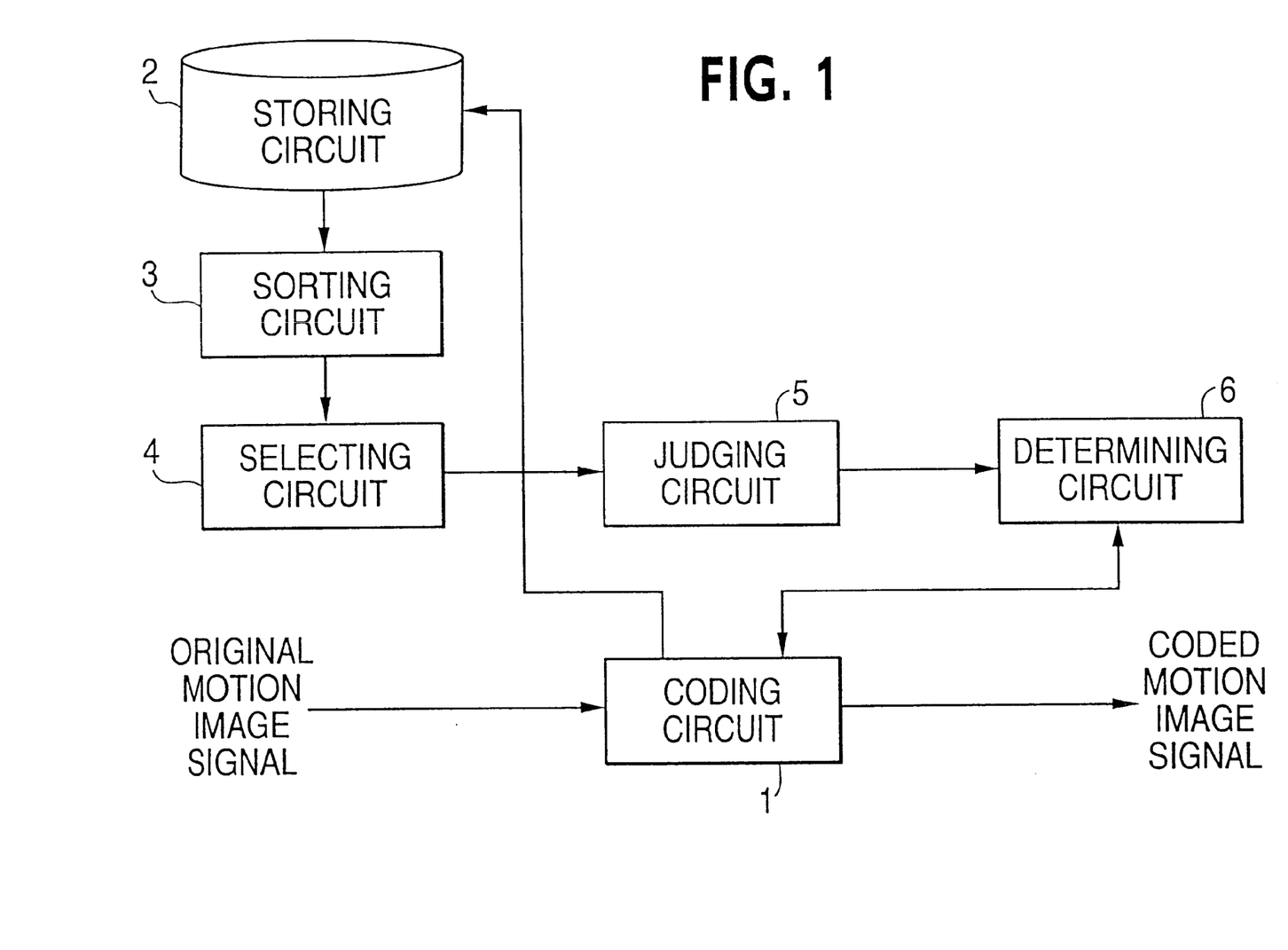
FIG. 1 is a diagram showing a structure of a motion image encoder according to a preferred embodiment of the present invention.
Figure 2:
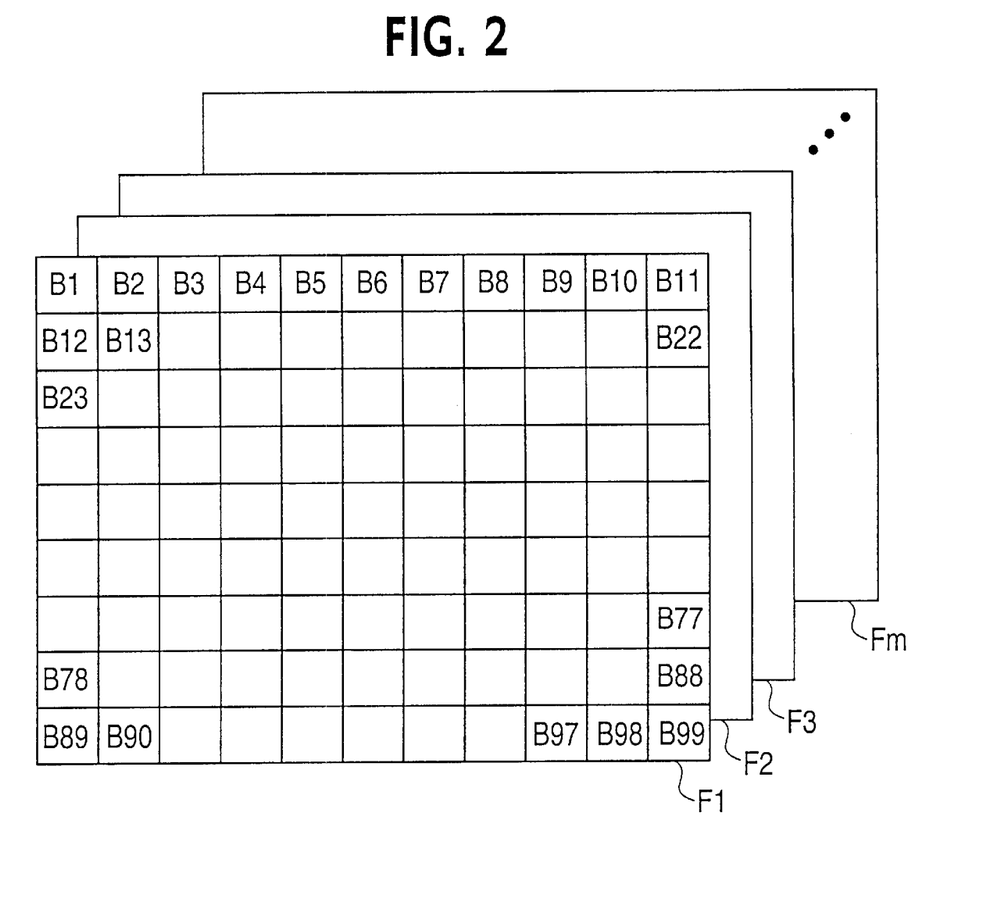
FIG. 2 is a diagram showing frames and blocks forming motion images.

As shown in FIG. 1, the motion image encoder receives original motion image signals, then codes the original motion image signals and then outputs coded motion image signals. The motion image signals represent consecutive m frames F1 to Fm (m is a positive integer greater than 1). As shown in FIG. 2, each frame is composed of 99 (9×11) blocks B1 to B99 each including a given number of pixels, such as 16×16 pixels.

The motion image encoder comprises a coding circuit 1, a storing circuit 2, a sorting circuit 3, a selecting circuit 4, a judging circuit 5 and a determining circuit 6.

The coding circuit 1 executes intraframe coding or interframe coding of the original motion image signals per block. The coding includes, for example, orthogonal transforms, quantization and Huffman coding. The coding circuit 1 further functions to calculate a variance and a SAD (Sum of Absolute Difference) for each block based on the original motion image signals, and outputs them to the storing circuit 2 and the determining circuit 6. The variance is a value to be used for determining whether to apply the intraframe coding or the interframe coding to a block to be coded. The variance represents the sum of absolute differences each between a value of one of pixels in a block and a mean pixel value of the same block. As appreciated, the mean pixel value is derived by dividing the sum of the values of the pixels in the block by the number of the pixels in the same block. On the other hand, the SAD represents a magnitude of image variation between corresponding blocks of two consecutive frames, i.e. a magnitude of image variation between a block of a frame and a corresponding block of a preceding adjacent frame. The SAD represents the sum of absolute values of predicted errors between corresponding blocks of two consecutive frames, i.e. the sum of absolute differences each between a value of one of pixels in a block of a frame and a value of corresponding one of pixels in a corresponding block of a preceding adjacent frame.

Figure 3:
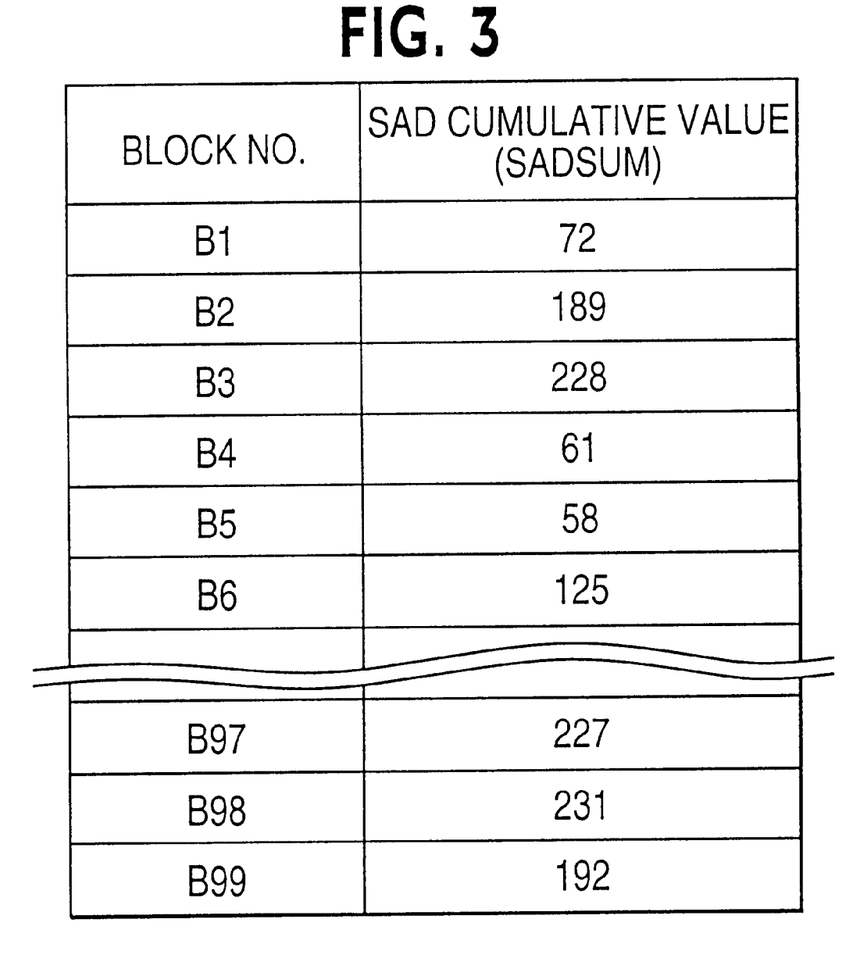
FIG. 3 is a diagram showing SAD cumulative values corresponding to the blocks.

As shown in FIG. 3, the storing circuit 2 accumulates SAD's, received from the coding circuit 1, to derive a SAD cumulative value SADSUM per block. As described above, since a SAD represents a magnitude of image variation per block, a SAD cumulative value SADSUM represents the accumulation of image variations per block, i.e. an image variation history per block. For example, with respect to a block B1, by adding a SAD1 (SAD corresponding to the block B1), received from the coding circuit 1, to a SAD-SUM1 (SAD cumulative value corresponding to the block B1), a new SADSUM1 is obtained for the block B1. Since image variations, i.e. SAD's, differ per block, the increasing speed of a SAD cumulative value SADSUM differs per block. For example, the increasing speed of a SAD cumulative value corresponding to a block whose image variation is aggressive is higher than that of a SAD cumulative value corresponding to a block whose image variation is moderate.

The sorting circuit 3 sorts the SAD cumulative values corresponding to the blocks B1 to B99, received from the storing circuit 2, in order of magnitudes thereof from large to small.

The selecting circuit 4 selects three largest SAD cumulative values from among the SAD cumulative values sorted by the sorting circuit 3, and further selects block numbers of blocks corresponding to the selected SAD cumulative values as UPD1 to UPD3 (hereinafter, blocks corresponding to the selected SAD cumulative values will be referred to as "blocks UPD1 to UPD3"). The selecting circuit 4 further functions to reset the SAD cumulative values corresponding to the blocks UPD1 to UPD3 to zero at appropriate timings for starting new accumulation of SAD's for those blocks, respectively.

The judging circuit 5 judges whether a block to be coded by the coding circuit 1 agrees with any one of the blocks UPD1 to UPD3 selected by the selecting circuit 4. The judging circuit 5 outputs to the determining circuit 6 an agree/disagree signal indicative of "agree" or "disagree".

In response to the agree/disagree signal from the judging circuit 5, the determining circuit 6 determines whether to apply the intraframe coding or the interframe coding to a block to be coded by the coding circuit 1. Specifically, the determining circuit 6 determines to apply the intraframe coding when the agree/disagree signal represents "agree", and instructs the coding circuit 1 to execute the intraframe coding, i.e. "refresh". On the other hand, when the agree/disagree signal represents "disagree", the determining circuit 6 determines whether to apply the intraframe coding or the interframe coding based on a variance of the block received from the coding circuit 1, and instructs the coding circuit 1 to execute the determined coding. Since the determination of the determining circuit 6 based on the variance is known in the art, detailed explanation thereof is not given.

In response to the instructions from the determining circuit 6, the coding circuit 1 executes the coding of the block. As a result of applying the foregoing coding to each of the blocks of each of the frames, coded motion image signals are outputted. The coded motion image signals are added with header information etc. at a multiplexing circuit (not shown), temporarily stored in a buffer circuit (not shown), applied with error correction coding at an error correction coding circuit (not shown), and then outputted from the encoder and sent to a decoder (not shown).

Figure 4:
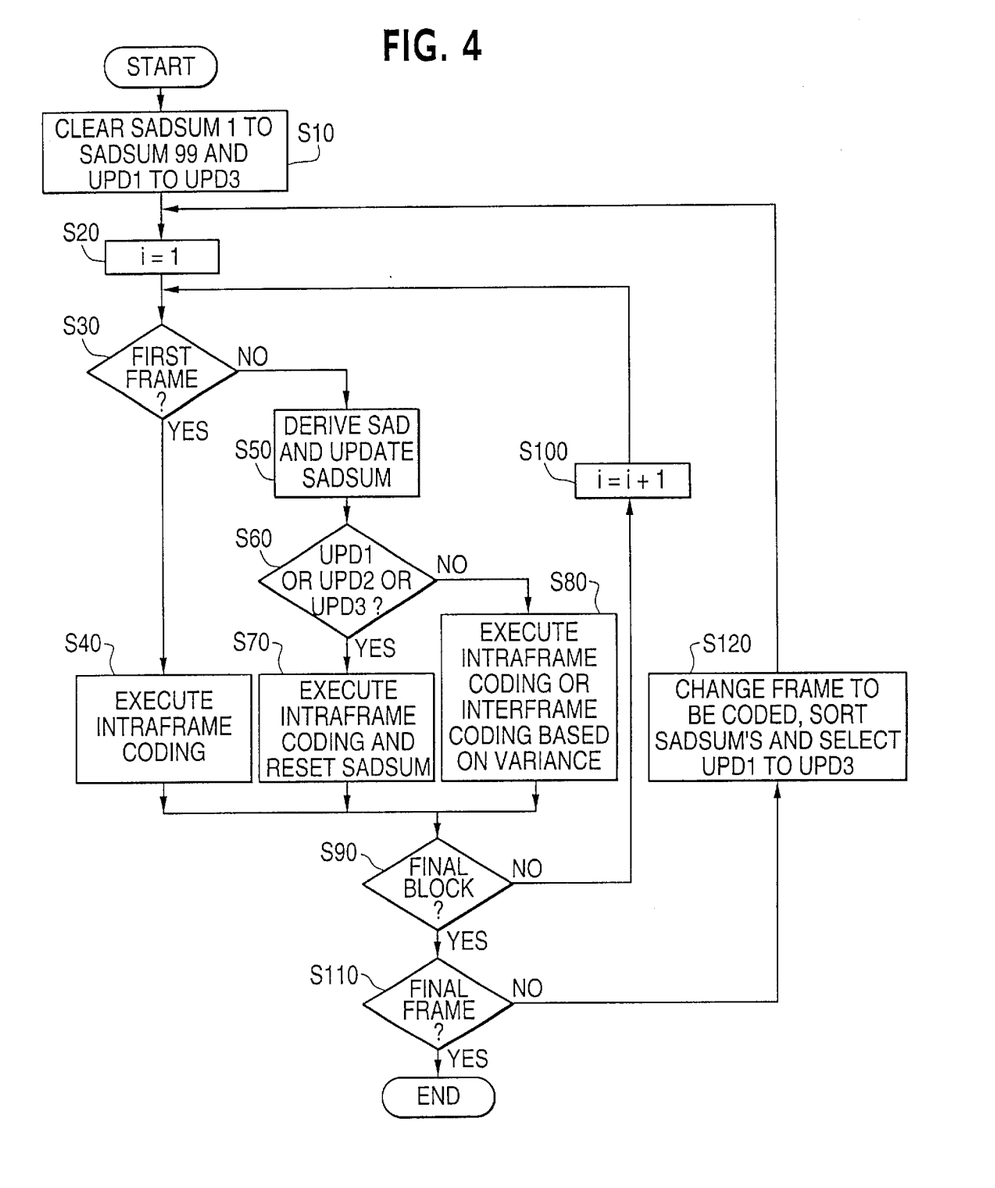
FIG. 4 is a flowchart showing an operation of the motion image encoder shown in FIG. 1.

Now, an operation of the foregoing motion image encoder will be described with reference to FIG. 4, wherein i (=1 to 99) represents a variable corresponding to a block number (=B1 to B99) for advancing coding of the blocks in turn.

<Step S10>

SADSUM's 1 to 99 (SAD cumulative values corresponding to blocks B1 to B99) and UPD1 to UPD3 are cleared.

<Step S20> i is initially set to 1 (i=1).

<Step S30>

It is judged whether a frame to be coded is a first frame F1 of motion images.

<Step S40>

If positive at step S30, i.e. if it is judged to be the first frame F1 at step S30, a block B1 is intraframe-coded. Since step S40 executes the intraframe coding while step S30 continues to judge positively, all blocks of the frame F1 are intraframe-coded at step S40.

<Step S50>

If negative at step S30, i.e. if it is judged not to be the first frame F1 at step S30, a SAD1 (SAD corresponding to the block B1) is derived. Then, the SAD1 is added to the SADSUM1 to update the SADSUM1.

<Step S60>

It is judged whether the block B1 to be coded agrees with any one of blocks UPD1 to UPD3 selected at step S120.

<Step S70>

If positive at step S60, i.e. if the block B1 is judged to agree with any one of the blocks UPD1 to UPD3 at step S60, the block B1 is refreshed, i.e. intraframe-coded, and the SADSUM1 corresponding to the block B1 is reset to zero.

<Step S80>

If negative at step S60, i.e. if the block B1 is judged not to agree with any one of the blocks UPD1 to UPD3 at step S60, either of the intraframe coding and the interframe coding is selected based on a variance of the block B1, and applied to the block B1.

<Step S90>

It is judged whether the coded block B1 is the final block B99.

<Step S100>

If negative at step S90, i.e. if the coded block B1 is judged not to be the final block B99 at step S90, i is incremented by one. Accordingly, a block to be coded is changed from the block B1 to the block B2. Then, the routine returns to step S30 for executing the foregoing steps with respect to the block B2.

<Step S110>

If positive at step S90, i.e. if the coded block B1 is judged to be the final block B99 at step S90, it is judged whether the frame is a final frame Fm of the motion images. If positive, the routine is finished.

<Step S120>

If negative at step S110, i.e. if it is judged not to be the final frame Fm at step S110, a frame to be processed is changed to a next frame. Accordingly, assuming that coding of a frame F2 has been finished, coding of a frame F3 is started. Further, by sorting the updated SADSUM's 1 to 99 in order of magnitudes thereof from large to small, UPD1 to UPD3 are selected. Accordingly, assuming that coding of the blocks B1 to B99 of the frame F2 has been finished, UPD1 to UPD3 are selected in preparation for coding blocks B1 to B99 of the frame F3.

Then, upon returning to step S20 from step S120, coding of the blocks B1 to B99 of the frame F3 is started. Thereafter, by repeating the foregoing processes, blocks B1 to B99 of subsequent frames F4 to Fm are coded.

Figure 5A:
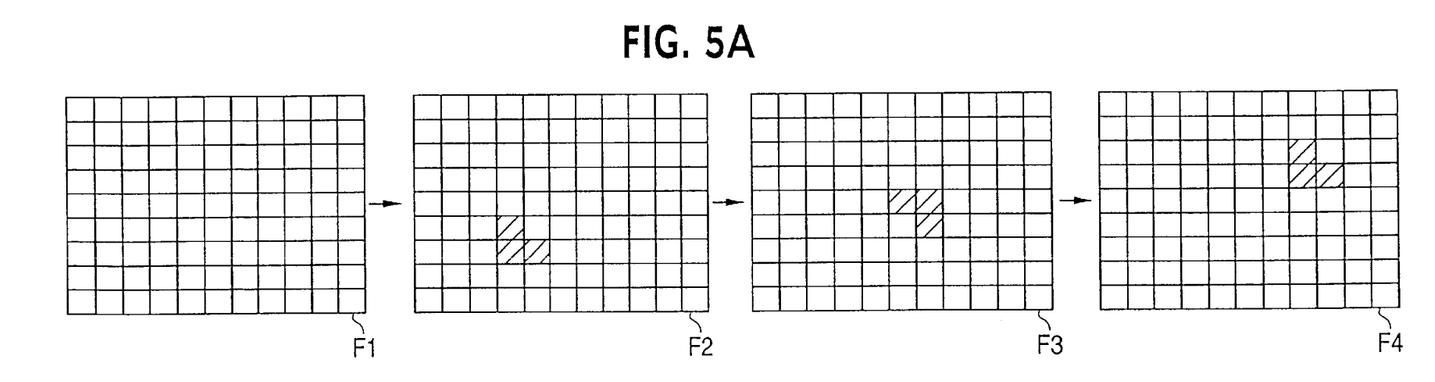
FIGS. 5A and 5B are diagrams for explaining a difference in operation between the motion image encoder shown in FIG. 1 and a conventional motion image encoder.
Figure 5B:
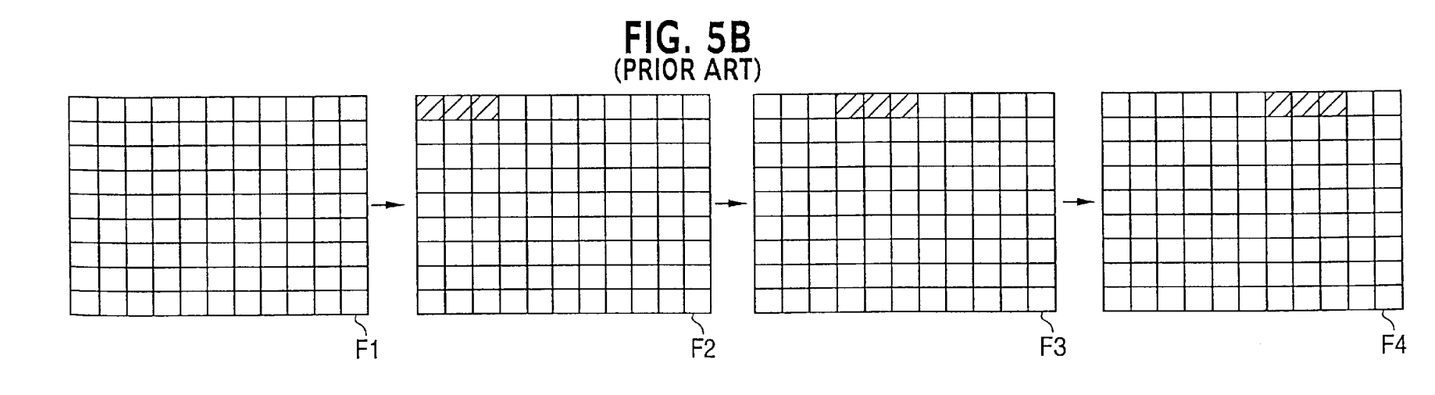

In FIGS. 5A and 5B, blocks to be refreshed are shown by hatching. According to the motion image encoder shown in FIG. 1, blocks to be refreshed are determined based on SAD cumulative values. Therefore, as shown in FIG. 5A, positions of the blocks to be refreshed are put in non-fixed order, i.e. become irregular. However, this irregularity represents that the blocks actually requiring "refresh" are preferentially refreshed.

On the other hand, according to the conventional motion image encoder, blocks to be refreshed are changed pursuant to a fixed rule, for example, from blocks with smaller block numbers to blocks with larger block numbers as shown in FIG. 5B. Therefore, the refresh becomes too much or too little as described before.

According to the motion image encoder shown in FIG. 1, since the blocks actually requiring "refresh" are preferentially refreshed as described above, the refresh can be prevented from becoming too much or too little. Therefore, the efficiency of the coding can be ensured, while an influence of decoding failure can be cut off early enough.

Figure 6:
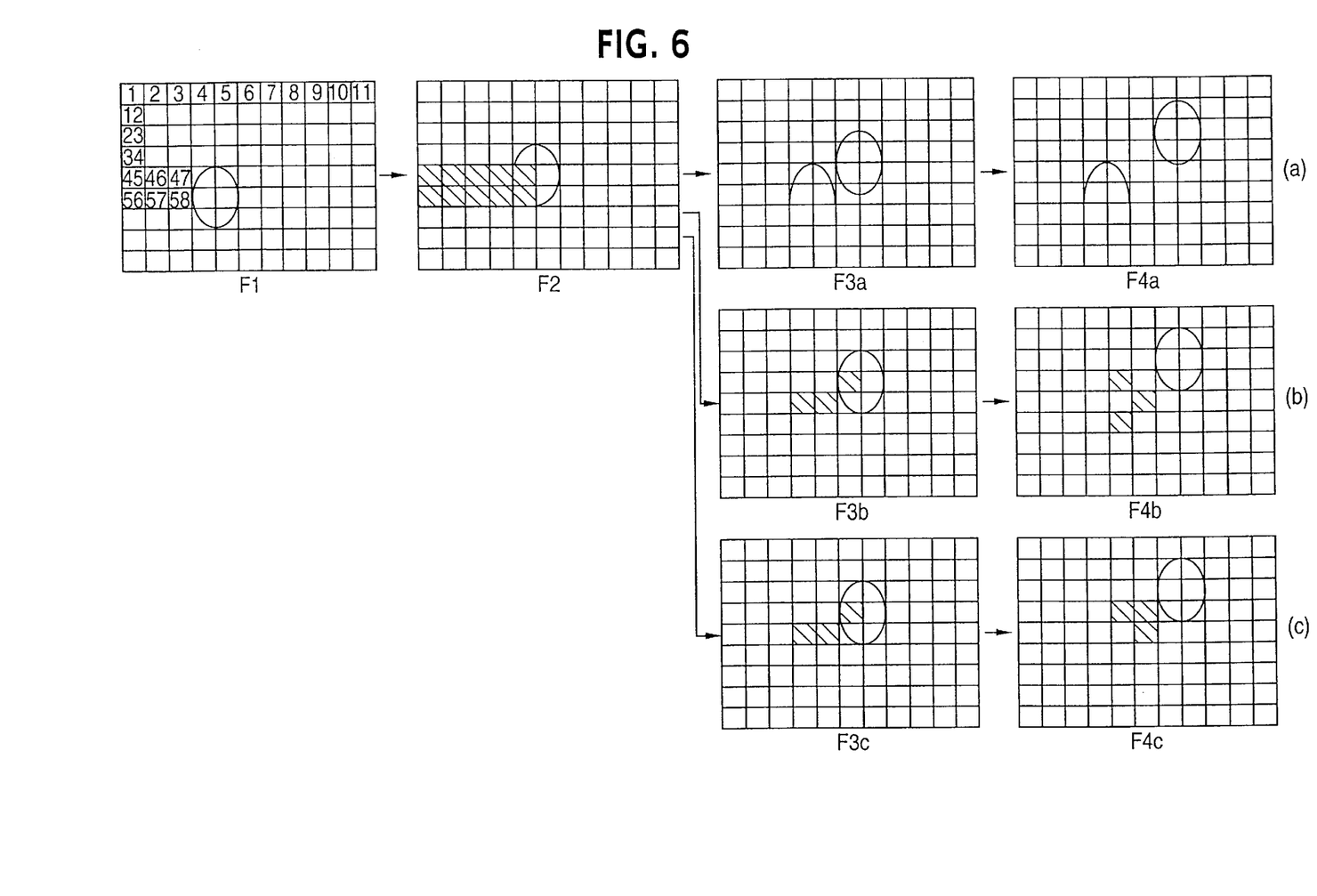
FIG. 6 is a diagram for explaining an effect of "refresh" to be executed based on SAD cumulative values according to the preferred embodiment of the present invention.

FIG. 6 shows frames reproduced by a decoder, wherein (a) represents a case in which "refresh" (intraframe coding) has not been executed or, even if executed, it is in the manner shown in FIG. 5B, (b) represents a case in which "refresh" has been executed based on SAD cumulative values SADSUM's according to the foregoing preferred embodiment of the present invention, and (c) represents a case in which "refresh" has been executed based on SAD's. In the following explanation, it is assumed that the decoder has failed in decoding blocks B45 to B49 and B56 to B60 of a frame F2.

At (a) in FIG. 6, due to the decoding failure in the frame F2, the decoder copies blocks B45 to B49 and B56 to B60 of a frame F1 for corresponding blocks of a frame F3a. Accordingly, the blocks 48, 49, 59 and 60 of the frame 3a show an upper part of an ellipse. Since the refresh has not been executed (at least for the associated blocks as shown in FIG. 5B), this upper part of the ellipse remains in a frame F4a.

At (b) in FIG. 6, since blocks B39, B48 and B49 of a frame F3b have been refreshed based on SAD cumulative values SADSUM's (i.e. blocks B39, B48 and B49 correspond to blocks UPD1 to UPD3), the frame F3b is decoded as shown in FIG. 6.

At (c) in FIG. 6, since blocks B39, B48 and B49 of a frame F3c have been refreshed based on SAD's, the frame F3c is decoded as shown in FIG. 6.

In comparison between (b) and (c), the refreshed blocks are the same with respect to the frames F3b and F3c. Also with respect to frames F4b and F4c, blocks B38 and B50 have been commonly refreshed. On the other hand, while a block B60 of the frame F4b has been refreshed, a block B39 of the frame F4c has been refreshed like the block B39 of the frame F3c. As appreciated, it was actually necessary for the block B60 of the frame F4b to be refreshed because of a large SAD cumulative value corresponding thereto. On the other hand, the block B39 of the frame F4c was refreshed because of only a large magnitude of image variation between the frames F3c and F4c, i.e. a large SAD between the blocks B39 of the frames F3c and F4c. This means that when a block to be refreshed is determined based on a SAD cumulative value as in the preferred embodiment of the present invention, an image variation history of each block can be reflected on the determination, so that a block which actually requires "refresh" can be precisely judged. On the other hand, this can not be achieved when a block to be refreshed is determined based on a SAD.

As described above, in the motion image encoder according to the preferred embodiment of the present invention, image variations are accumulated per block and a block with a larger cumulative variation is preferentially refreshed. Therefore, a block which actually requires "refresh" can be correctly selected as compared with a case wherein a block is refreshed pursuant to a rule regulating order of blocks to be refreshed, or based on only a SAD.

In the foregoing preferred embodiment, SADSUM's updated at step S50 (see FIG. 4) up to, for example, the frame F2 are sorted in the foregoing order at step S120 after finishing the coding of the frame F2 at steps S70 and S80, in preparation for coding the blocks of the frame F3. However, it may be arranged that the SADSUM's updated up to the frame F2 are sorted to select UPD1 to UPD3 before starting the coding of the frame F2. As appreciated, to be exact, the refresh operation shown in FIG. 5A is obtained using this modification. The reason is that the blocks of the frame F2 are refreshed based on the SAD cumulative values in FIG. 5A, which does not happen in the routine shown in FIG. 4.

In the foregoing preferred embodiment, assuming that a frame to be coded is the frame F3, SAD's are derived using the frames F2 and F3 and variances are derived using the frame F3. On the other hand, SAD's may be derived using the frames F1 and F2 and variances may be derived using the frame F2.

In the foregoing preferred embodiment, the number of blocks to be selected is set to three, which, however, may be set to a number other than three. It may also be arranged that the selecting circuit 4 selects all blocks whose corresponding SAD cumulative values exceed a threshold value, i.e. without setting the number of blocks to be selected.

Further, it may also be arranged that "refresh" is executed according to the foregoing preferred embodiment of the present invention and according to the foregoing conventional cyclic refresh execution. Specifically, the selecting circuit 4 stores a rule regulating order of blocks to be refreshed, and selects blocks to be refreshed referring to the stored rule and SAD cumulative values SADSUM's. With this arrangement, for example, blocks to be refreshed may be selected based on the rule when image variations are small over the whole frame, while blocks to be refreshed may be selected based on the SAD cumulative values when an image variation is large even at a part of the frame. This can effectively reduce an influence of decoding failure.

While the present invention has been described in terms of the preferred embodiment, the invention is not to be limited thereto, but can be embodied in various ways without departing from the principle of the invention as defined in the appended claims.

What is claimed is:

1. A motion image encoder which selectively performs one of intraframe coding and interframe coding of blocks forming each of a plurality of consecutively transmitted frames representing motion images, said motion image encoder comprising:

a deriving section which sequentially derives block image variation magnitudes for each of the blocks in each of the consecutively transmitted frames, each of said block image variation magnitudes being derived by comparing corresponding blocks of each pair of consecutive frames;

an accumulating section which adds said block image variation magnitudes for the corresponding blocks of each of the consecutively transmitted frames to derive an image variation cumulative value for each block;

a selecting section which, based on said image variation cumulative values for each respective block, selects at least one of the blocks on which to perform the intraframe coding; and a coding section which performs the intraframe coding on said at least one of the blocks selected by said selection section.

2. The motion image encoder according to claim 1, wherein the selecting section selects said at least one of the blocks whose corresponding image variation cumulative value is the greatest among said image variation cumulative values.

3. The motion image encoder according to claim 1, wherein said selecting section selects those blocks whose corresponding image variation cumulative values are larger among said image variation cumulative values.

4. The motion image encoder according to claim 1, wherein said selecting section selects said at least one of the blocks whose corresponding image variation cumulative value is greater than a threshold value.

5. The motion image encoder according to claim 1, wherein said selecting section selects those blocks whose corresponding image variation cumulative values are greater than a threshold value.

6. The motion image encoder according to claim 1, further comprising a sorting section which sorts said image variation cumulative values in given order, wherein said selecting section selects said at least one of the blocks based on said image variation cumulative values sorted by said sorting section.

7. The motion image encoder according to claim 1, wherein said selecting section stores a rule regulating order of the blocks to be applied with the intraframe coding, and selects said at least one of the blocks based on said image variation cumulative values and said rule.

8. The motion image encoder according to claim 1, wherein said accumulation section is operable to add an image variation magnitude of a respective one of the blocks to an existing image variation cumulative value so as to obtain a new image variation cumulative value of said respective one of the blocks, said previous image variation cumulative value being obtained by adding image variation magnitudes of the blocks corresponding to said respective one of the blocks.

\* \* \* \* \*